(12) United States Patent
Bindschedler et al.

(10) Patent No.: US 10,870,981 B1
(45) Date of Patent: Dec. 22, 2020

(54) THERMALLY INSULATED ROOFING DEVICE

(71) Applicant: SOPREMA, Strasbourg (FR)

(72) Inventors: Pierre-Etienne Bindschedler, Strasbourg (FR); Jérémie Boucher, Epinal (FR); Rémi Perrin, Boersch (FR)

(73) Assignee: SOPREMA, Strasbourg (FR)

( * ) Notice: Subject to any disclaimer, the term of this patent is extended or adjusted under 35 U.S.C. 154(b) by 0 days.

(21) Appl. No.: 16/551,144

(22) Filed: Aug. 26, 2019

(30) Foreign Application Priority Data

Oct. 2, 2018 (EP) .................................. 18 306 298

(51) Int. Cl.
*E04B 1/62* (2006.01)
*E04D 12/00* (2006.01)
(Continued)

(52) U.S. Cl.
CPC .............. *E04B 1/625* (2013.01); *E04C 2/243* (2013.01); *E04D 3/352* (2013.01); *E04D 12/002* (2013.01);
(Continued)

(58) Field of Classification Search
CPC ....... E04B 1/625; E04C 2/243; E04D 12/002; E04D 3/352; B32B 2307/304; B32B 21/08; B32B 2307/724; B32B 27/32; B32B 3/18; B32B 21/042; B32B 2307/7145; B32B 27/30; B32B 21/02; B32B 2419/06; B32B 2307/7265
(Continued)

(56) References Cited

U.S. PATENT DOCUMENTS 3,694,306 A * 9/1972 Fricklas .................. E04B 1/941
428/341
3,814,659 A * 6/1974 Nadeau .............. C08G 18/4045
428/215
(Continued)

FOREIGN PATENT DOCUMENTS

FR 2 308 748 11/1976
WO 2012147040 11/2012

OTHER PUBLICATIONS

Isonat: "Guide de mise en oeuvre -isolants rigides" Dec. 5, 2011; Extra it de 1 'Internet: URL:http://www.isonat.com/uploads/files/guides/GuidePose Rigide Toiture BDEF.pdf.
(Continued)

*Primary Examiner* — Brent W Herring
(74) *Attorney, Agent, or Firm* — Ipsilon USA, LLP

(57) ABSTRACT

One subject of the present invention is a roofing device (1) comprising an area support (2) made up of panels of wood particles on which a vapor barrier first layer (3), an insulating second layer (4) and a third layer (5) that is impermeable to liquid water are laid.
Said device (1) is one wherein the second layer (4) is a composite layer formed by the superposition of two distinct homogeneous elementary layers (6 and 6'), namely a lower elementary layer (6) of wood fiber and an upper elementary layer (6') made up of a material that is at least partially bio-sourced, that has hygroscopic, antifungal and thermal-insulation properties and that has a low resistance to the diffusion of water vapor.

10 Claims, 1 Drawing Sheet

(51) Int. Cl.
*E04D 3/35* (2006.01)
*E04C 2/24* (2006.01)
*B32B 21/04* (2006.01)
*B32B 21/02* (2006.01)
*B32B 3/18* (2006.01)
*B32B 27/30* (2006.01)
*B32B 27/32* (2006.01)
*B32B 21/08* (2006.01)

(52) U.S. Cl.
CPC .............. *B32B 3/18* (2013.01); *B32B 21/02* (2013.01); *B32B 21/042* (2013.01); *B32B 21/08* (2013.01); *B32B 27/30* (2013.01); *B32B 27/32* (2013.01); *B32B 2307/304* (2013.01); *B32B 2307/7145* (2013.01); *B32B 2307/724* (2013.01); *B32B 2307/7265* (2013.01); *B32B 2419/06* (2013.01)

(58) Field of Classification Search
USPC ............ 52/90.1, 408, 506.01, 782.1, 784.15, 52/794.1
See application file for complete search history.

(56) References Cited

U.S. PATENT DOCUMENTS

| | | | | | |
|---|---|---|---|---|---|
| 4,567,080 | A | * | 1/1986 | Korsgaard | E04B 1/66 428/137 |
| 4,696,138 | A | * | 9/1987 | Bullock | E04B 1/7604 52/268 |
| 4,852,314 | A | * | 8/1989 | Moore, Jr. | E04D 13/17 52/199 |
| 5,884,446 | A | * | 3/1999 | Hageman | E04D 11/02 52/309.8 |
| 6,108,993 | A | * | 8/2000 | Hageman | E04D 13/1643 52/309.8 |
| 7,765,756 | B2 | * | 8/2010 | Bontrager, II | E04D 11/02 428/316.6 |
| 8,966,845 | B1 | * | 3/2015 | Ciuperca | E04B 1/80 52/309.12 |
| 9,745,737 | B2 | * | 8/2017 | Raidt | D06N 3/0011 |
| 10,494,809 | B2 | * | 12/2019 | Romes | E04B 1/7666 |
| 2004/0261347 | A1 | * | 12/2004 | Hageman | E04D 5/10 52/506.01 |
| 2009/0301016 | A1 | * | 12/2009 | Schroer | E04B 1/66 52/408 |
| 2015/0352806 | A1 | * | 12/2015 | Faotto | E04B 1/942 428/323 |
| 2016/0339670 | A1 | * | 11/2016 | Faotto | E04B 1/80 |
| 2016/0369493 | A1 | * | 12/2016 | Raidt | D06N 3/0063 |
| 2017/0368792 | A1 | * | 12/2017 | Faotto | B32B 5/26 |
| 2018/0320370 | A1 | * | 11/2018 | Letts | B32B 37/182 |

OTHER PUBLICATIONS

EU Search Report dated Jan. 10, 2019.
French Search Report dated Jun. 1, 2018.

* cited by examiner

THERMALLY INSULATED ROOFING DEVICE

RELATED APPLICATION

This application claims the benefit of priority from European Patent Application No. 18 306 298.3, filed on Oct. 2, 2018, the entirety of which is incorporated by reference.

FIELD OF THE INVENTION

The present invention relates to the field of deck roofs, namely, in general, a single-pitch substantially flat roof with a pitch of under 10%, preferably of under 5%, but also pitched roofs and more particularly those built on a wood support and incorporating a significant, if not to say predominant, proportion of bio-sourced materials.

The invention is aimed more specifically at a thermally insulated, and preferably also sound-insulated, roofing device of compact structure.

DESCRIPTION OF RELATED ART

At the present time, deck-roof or pitched-roofs constructions based on essentially bio-sourced materials are already known which comprise an area support consisting of panels based on agglomerated woodchip and/or wood particles on which there are laid, in succession and according to a layering approach, i) at least a first layer that forms a barrier regulating the passage of water vapor (also known as the vapor barrier), ii) at least an insulating second layer made up at least in part of a material based on wood fiber, and iii) at least a third layer that is substantially impervious to liquid water.

This third layer may have a resistance to the diffusion of water vapor that may vary (Sd>200 m for bituminous membranes and Sd>25 m for synthetic membranes).

In these known constructions, the insulating second layer is made up entirely of wood fiber (in one or several layers) forming a material that is permeable to water vapor ($\mu=3$) and hygroscopic, but can rot: the material and its properties can become degraded in the event of fungal growth. Such detrimental growth may occur when the relative humidity and the temperature are high (for example: RH>85% combined with T>12° C. for a prolonged incubation period) in the region of the insulation. Now, these threshold temperature and relative-humidity conditions are occasionally reached in the outer layer of the insulation, particularly in temperate regions.

Relative humidity is defined as being the ratio of the water content of the air to the maximum water content this same air can hold, and this maximum water content is dependent on the temperature, warm air being able to contain far more water in the form of vapor than cold air. Given that the layer of wood fibers is used as a thermal insulator, this layer specifically constitutes the layer of material within which the temperature gradient between the internal environment and the external environment will be established.

Thus, particularly during seasonal low temperatures with rooms that are heated, it will be appreciated that the temperature in the insulating layer will be markedly higher on the internal face of this layer (close to the internal environment) than on the external face (close to the external environment) thereof. The relative humidity of the air between the fibers on the outside will therefore be markedly higher than on the inside (for the same number of water molecules present per m$^3$) and may, depending on the circumstances, even lead to a phenomenon of condensation within the insulating layer.

Exposure to the risks of degradation through fungal growth (when the temperature conditions are ripe for this) is therefore high in the abovementioned context, something that the inventors have been able to corroborate through experimentation and simulation.

OBJECT AND SUMMARY

The general problem behind the present invention is, therefore, in the context of the roofing devices defined above, to propose a solution that makes it possible to considerably reduce, if not to say eliminate, the risk of fungal growth, while at the same maintaining insulation performance and compactness which are at least equivalent to the current constructions, as well as advantageously and at least partially, and preferably predominantly if not to say completely, bio-sourced origin for the insulating materials, preferably without an increase in weight.

The document "Isonat: Guide de mise en œuvre—isolants rigides [Isonat: Rigid insulation, guide to use]" by the company Buitex Industries, discloses a thermally insulated pitched-roof or deck-roof device with a compact structure.

That device comprises an area support or roof deck, which may possibly be made up of panels based on agglomerated woodchip and/or wood particles, on which there are laid, in succession and according to a layered approach, at least a first layer that forms a barrier regulating the passage of water vapor, at least an insulating second layer made up at least in part of a material based on wood fiber, and at least a third layer that is substantially impervious to liquid water, the insulating second layer being a composite layer formed by the superposition of two distinct homogeneous elementary layers, namely a lower elementary layer made from a material based on wood fiber, resting on the first layer, and an upper elementary layer on which the third layer rests.

In this known device, water tightness is essentially obtained by use of a mechanical roof covering, namely one made up of a collection of individual elements (tiles, slates, etc.) resting on specific laths and with the underside of which there is associated a roof membrane for the passage of accidental water, that forms the aforementioned third layer.

The use of a roof membrane with high permeability to water vapor and the existence of a ventilated airgap between the mechanical covering and this membrane therefore ensures good removal of any moisture that might be present in the insulating layer.

However, the resulting construction is complicated, bulky, cumbersome and expensive and is not well suited to deck roofs with pitches generally less than 5%.

The invention seeks to provide a solution that makes it possible to get around the limitations and disadvantages of such a construction while at the same time solving the general problem set out hereinabove.

This object is achieved by a deck-roofing or pitched-roofing device like that introduced in the introduction and wherein the third layer that forms the upper and outer layer of the device consists of a sealing membrane, made either of bituminous or synthetic material, the upper elementary layer is formed of an at least partially bio-sourced material having hygroscopic, antifungal and thermal-insulation properties, offering low resistance to the diffusion of water vapor and selected from the group formed from expanded cork, expanded perlite and wood wool, the ratio [upper layer/lower layer], in terms of the ratio of their respective thicknesses or of their respective thermal resistances, is comprised between 0.25 and 0.6, and the first layer consists of a membrane forming a hygrovariable vapor barrier.

BRIEF DESCRIPTION OF THE DRAWINGS

The invention will be better understood by virtue of the following description, which relates to preferred embodiments, given by way of nonlimiting example and explained with reference to the attached schematic drawings, in which.

DETAILED DESCRIPTION

Figure 1:
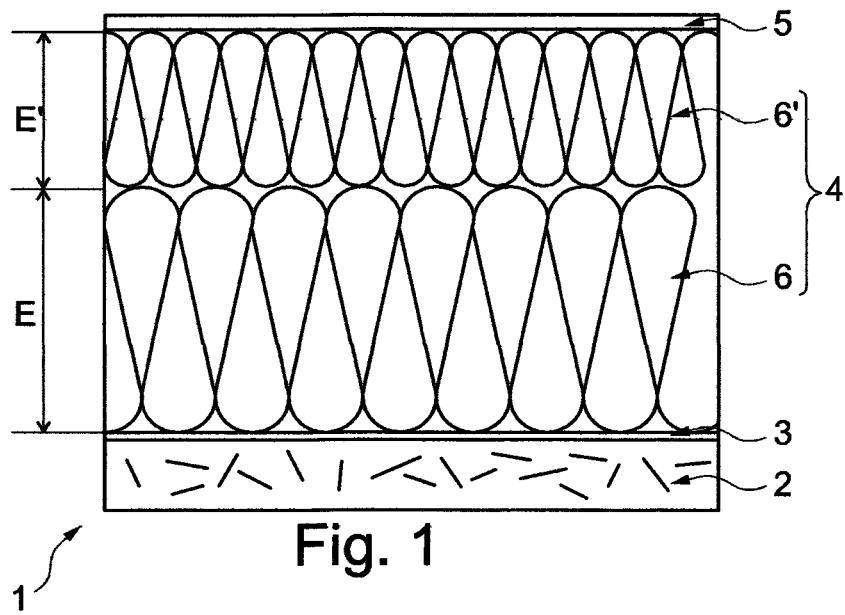
FIG. 1 is a partial view in cross section of a deck-roofing device according to a first embodiment of the invention.
Figure 2:
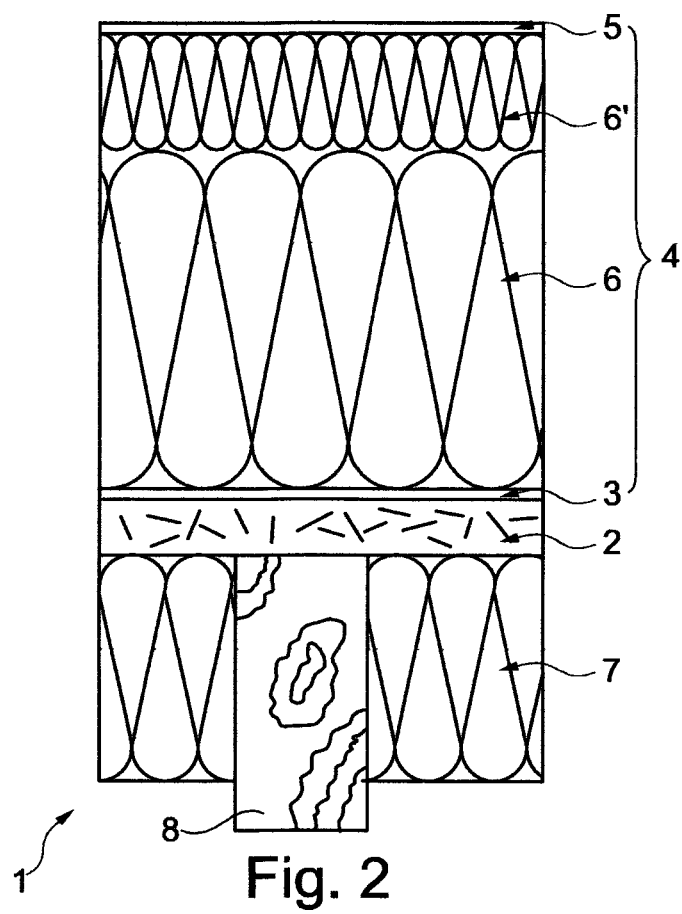
FIG. 2 is a view similar to FIG. 1 of a second embodiment of the invention.

FIGS. 1 and 2 illustrate schematically and by way of examples a thermally insulated roofing device 1, in this instance a deck roof, having a compact structure, notably a surface support 2 made up of panels based on agglomerated woodchip or wood particles, on which there are laid, successively and according to a layered approach (from the inside toward the outside or from the bottom upward in FIGS. 1 and 2), at least a first layer 3 that forms a barrier regulating the passage of water vapor, at least an insulating second layer 4 made up at least in part of a material based on wood fiber and at least a third layer 5 that is substantially impervious to liquid water.

For preference, this third layer 5 also has excellent resistance to chemical agents and to pollution.

The insulating second layer 4 is a composite layer formed by the superposition of two distinct homogeneous elementary layers 6 and 6', namely a lower elementary layer 6 made from a material based on wood fiber, resting on the first layer 3, and an upper elementary layer 6', on which the third layer 5 rests.

According to the invention, the third layer 5, that forms the upper and outer layer of the device 1, consists of a sealing membrane, made either of bituminous or of synthetic material, and the upper elementary layer 6' is formed of a material that is at least partially bio-sourced, having hygroscopic, antifungal and thermal-insulation properties and opposing low resistance to the diffusion of water vapor, and selected from the group formed from expanded cork, expanded perlite and wood wool. In addition, the ratio [upper layer 6'/lower layer 6], in terms of the ratio of their respective thicknesses E'/E or of their respective thermal resistances R'/R, is comprised between 0.25 and 0.6, and the first layer 3 consists of a membrane that forms a hygrovariable vapor barrier.

The use of a sealing layer by way of third, upper layer 5 directly exposed to the climatic agents and to inclement weather makes it possible to arrive at a device having a limited number of superposed layers, at a roof 1 that is compact, lightweight and relatively economical, that can be used for any sloping roof or deck roof.

The use of a hygrovariable vapor barrier 3 on the interior side of the device 1 (on warm side of the layered wrapping) allows the vapor to be rediffused toward the inside, for a lower layer 6 of insulating material, and thus allows a material based on wood fiber, not specifically treated to withstand moisture and the consequences thereof, to be used for this layer.

However, the upper insulating layer 6', situated directly under the sealing layer 5, which acts as an outer skin of the roof having a very low permeability to water vapor, can profit only marginally, if at all, from the properties of the hygrovariable membrane 3 (which is too far distant), and additionally is on the cold side of the layered wrapping of the roofing device 3. This configuration may lead to a high resident moisture content in this layer 6' or even to liquid water condensing out, which poses problems, particularly in winter periods and in temperate and arctic zones.

By proposing a two-component construction for the insulating layer 4, the invention allows the material made of wood fiber (which is natural but liable to rot) to be kept away from the external face (the upper surface of the layer 5) of the 3+4+5 layered covering, and by selecting a material with the aforementioned specific technical features for the layer 6', the invention benefits from its multiple advantageous properties in the target application, namely:

ease of validated thermal insulation in terms of construction, preferably at least equivalent to that of materials based on wood fiber;

resistance to fungal growth;

low resistance to vapor diffusion;

hygroscopic load absorption capacity (holding some of the moisture present between the first and third layers 3 and 5).

In addition, the material of the elementary layer 6' is at least partially of plant origin, and preferably entirely biosourced (based on a raw or recycled material).

By targeted specific selection of the nature of the material and of the amount of it present (thermal resistance/thickness), the layer 6' forms a hygrothermal screen which is insulating and resistant to fungal growth, having a good hygroscopic sorption capability and having good vapor permeability.

The aforementioned combination of characteristics of the constituent materials, of the configuration and of the arrangement of the layers of the device thus makes it possible to solve the stated problem and overcome the abovementioned disadvantages.

The layers 6 and 6' are fundamentally rigid in nature, at least self-supporting, and are preferably able to withstand a load, dependent on the nature of the roof (pitched roof, accessible deck roof which may or may not support walking).

The lower 6 and upper 6' elementary layers are preferably each made up of panels of corresponding bio-sourced material, potentially superposed.

Advantageously, and depending on how the layer 6' is made, wood wool panels bound with a hydraulic binder meet standard EN 13168 ($\mu$=5), expanded perlite panels meet standard EN 13169 ($\mu$=5) and expanded cork panels meet standard EN 13170.

Likewise, the wood fiber panels that form the lower elementary layer 6 advantageously meet standard EN 13171.

Like perlite, expanded cork, derived from the cork oak (expanded under the effect of steam) is naturally rot-proof, because of its tannin and suberin content. The same is true of wood wool.

The inventors have been able to observe, after a number of tests, that a ratio of 0.25 was the lower limit beyond which it was possible to substantially prevent any risk of fungal growth (in the laminate, notably the layer 6), at least in regions enjoying a Mediterranean, or even temperate, climate. Furthermore, above a ratio of 0.6, the economic cost and the long-term resource requirements were deemed unsustainable in a context of industrial and commercial exploitation.

The panels that make up the support 2 may for example be of the type known by the abbreviation OSB (Oriented Strand Board: which are layered panels in the form of wood strips bound together by a resin).

Each of the elementary layers 6 and 6' may of course itself be formed by a superposition of several sublayers or panels of the material in question.

What is meant by low resistance to the diffusion of water vapor in this document, in connection with the upper elementary layer 6', is a resistance Sd value of less than 20 m, advantageously less than 1.5 m, preferably less than 1.2 m.

Of course, the thicknesses E' and E of the two types of insulator to be used will be dependent on the desired total thermal resistance, but it ought advantageously always to have at minimum one quarter of said thermal resistance (of the composite complex 6+6') supplied by the expanded cork, the expanded perlite or the wood wool.

According to a first optimized alternative form of embodiment, derived from analyses and experiments conducted by the inventors and allowing the invention to provide the aforementioned advantageous properties over a wider range of climate conditions and with an optimized purchase cost (maximized use of wood fiber under the sealing membrane), it is preferable for the ratio R'/R of the thermal resistances R' and R of the respectively upper 6' and lower 6 elementary layers to be comprised between around 1/3 and around 1/2.

According to a second optimized alternative form of embodiment likewise leading to the aforementioned advantages, provision may also be made for the ratio E'/E of the thicknesses E' and E of the respectively upper 6' and lower 6 elementary layers to be comprised between around 1/3 and around 1/2 when the upper elementary layer 6' is based on expanded cork.

Because expanded cork has a thermal conductivity approximately equivalent to insulators based on wood fiber (X=0.04 W/m/K), this results in a non-increase in the thickness of the insulating second layer 4, for the same thermal performance.

The use of a map of regional climate conditions will allow a person skilled in the art to determine the minimum necessary value for the thickness E' of the upper elementary layer 6' and adapt the aforementioned ratios accordingly.

In order to give the layered covering a significant strength and notably a high compression strength, making it possible where appropriate to make the deck roof concerned "accessible", the lower elementary layer 6 based on wood fiber advantageously has a density of at least 100 kg/m$^3$, preferably of at least 150 kg/m$^3$, and a thickness of at least 60 mm, preferably of at least 80 mm.

According to one advantageous embodiment that offers increased thermal insulation, without increasing the insulating layer 4 situated above the area support 2, said device 1 may comprise at least one additional thermal insulation layer 7 attached under the internal or lower face of the area support 2, on the opposite face to its face that bears the layered covering formed by the first, second and third layers 3, 4, 5. Advantageously, this additional insulating layer 7 has, in prairie climate at an altitude of less than 600 m, a thermal resistance substantially equivalent to half the thermal resistance of the composite insulating second layer 4 and is preferably made entirely of a material based on wood fiber. In a cold climate, for an altitude of between 600 m and 900 m, this additional insulating layer 7 has a thermal resistance substantially equivalent to one third of the thermal resistance of the composite insulating second layer 4 and is still preferably made entirely of a material based on wood fiber.

According to an embodiment of the device 1 that is predominantly or entirely based on bio-sourced materials, this device may advantageously comprise a wood framework 8 supporting the panels that form the area support 2 (see FIG. 2).

According to one possible advantageous feature of the invention, the membrane of the first layer 3 forms not only a hygrovariable vapor barrier but also a substantially airtight barrier.

The hygrovariability of the membrane 3 is defined in such a way that the value Sd (resistance to the diffusion of water vapor) always lies between 0.35 m and 90 m. For preference, for the target application, the Sd value of the membrane 3 may vary from 0.5 m to 60 m according to the variants employed, and the conditions and regions of use.

The third layer 5 that forms the upper covering of the roof may be made of a synthetic sealing membrane made of polyvinyl chloride (PVC) or of thermoplastic olefin (TPO).

According to one nonlimiting practical embodiment of the device 1 according to the invention, more particularly suited to a construction of the deck-roof type, the various components of the layered covering may be as follows:

first layer 3: vapor barrier membrane, for example of the type known by the name SOPRAVAP HYGRO by the company SOPREMA;

lower elementary layer 6: "PAVATHERM-FORTE" panels, by the company PAVATEX;

upper elementary layer 6': expanded cork or perlite, or else wood wool, panels;

third layer 5: membrane of the SOPRAFIX UNILAY AR or FLAGON SR 15/10 type by the company SOPREMA.

Of course, the invention is not restricted to the embodiments described and depicted in the attached drawings. Modifications remain possible, particularly from the viewpoint of the makeup of the various elements or by substituting technical equivalents, without thereby in any way departing from the field of protection of the invention.

The invention claimed is:

1. A thermally insulated deck-roofing or pitched-roofing device with compact structure, comprising:

an area support made up of panels based on agglomerated woodchip and/or wood particles, on which there are laid, in succession and according to a layered approach, at least a first layer that forms a barrier regulating the passage of water vapor, at least an insulating second layer made up at least in part of a material based on wood fiber, and at least a third layer that is substantially impervious to liquid water, the insulating second layer being a composite layer formed by the superposition of two distinct homogeneous elementary layers, namely a lower elementary layer made from a material based on wood fiber, resting on the first layer, and an upper elementary layer on which the third layer rests, said device being one wherein:

the third layer that forms the upper and outer layer of the device has a sealing membrane, made either of bituminous or synthetic material, the upper elementary layer is formed of an at least partially bio-sourced material having hygroscopic, antifungal and thermal-insulation properties, offering low resistance to the diffusion of water vapor and selected from the group formed from expanded cork, expanded perlite and wood wool, the ratio upper layer/lower layer, in terms of the ratio of their respective thicknesses or of their respective thermal resistances, is comprised between 0.25 to 1 and 0.6 to 1, and the first layer has a membrane forming a hygrovariable vapor barrier.

2. The roofing device as claimed in claim 1, wherein the ratio of the thermal resistances of the respectively upper and lower elementary layers is comprised between around 1 to 3 and around 1 to 2.

3. The roofing device as claimed in either claim 1, wherein the ratio of the thicknesses of the respectively upper and lower elementary layers is comprised between around 1 to 3 and around 1 to 2 when the upper elementary layer is based on expanded cork.

4. The roofing device as claimed in claim 1, wherein the lower and upper elementary layers are each formed of corresponding panels of material.

5. The roofing device as claimed in claim 1, wherein the lower elementary layer based on wood fiber has a density of at least 100 kg/m$^3$, and a thickness of at least 60 mm.

6. The roofing device as claimed in claim 1, wherein said device comprises at least one additional thermal insulation layer attached under the internal or lower face of the area support, on its opposite face to the face bearing the layered covering formed by the first, second and third layers, this additional insulating layer having a thermal resistance substantially equivalent to half the thermal resistance of the composite insulation second layer.

7. The roofing device as claimed in claim 6, this additional insulating layer is made up entirely of a material based on wood fiber.

8. The roofing device as claimed in claim 1, wherein the third layer is a synthetic sealing membrane made of polyvinyl chloride (PVC) or of thermoplastic olefin (TPO).

9. The deck-roofing device as claimed in claim 1, said deck-roofing device comprising a wood framework bearing the panels that form the area support.

10. The roofing device as claimed in claim 1, wherein the lower elementary layer based on wood fiber has a density of at least 150 kg/m$^3$, and a thickness of at least 80 mm.

* * * * *